United States Patent
Gribbin

(12) 
(10) Patent No.: US 6,976,912 B2
(45) Date of Patent: Dec. 20, 2005

(54) ROTOR FOR A COMBINE HARVESTER

(76) Inventor: Stanley James Gribbin, 276 Station Road, Bethal, Northern Province (ZA)

( * ) Notice: Subject to any disclaimer, the term of this patent is extended or adjusted under 35 U.S.C. 154(b) by 0 days.

(21) Appl. No.: 10/814,172

(22) Filed: Apr. 1, 2004

(65) Prior Publication Data

US 2005/0043071 A1  Feb. 24, 2005

(30) Foreign Application Priority Data

Aug. 12, 2003  (ZA) ................................. 2003/6227

(51) Int. Cl.⁷ .............................. A01F 7/06; B02B 3/06
(52) U.S. Cl. ........................................... 460/66; 460/69
(58) Field of Search .............................. 460/66, 67, 69, 460/71, 73, 80, 81

(56) References Cited

U.S. PATENT DOCUMENTS

| | | | | |
|---|---|---|---|---|
| 4,250,897 A | * | 2/1981 | Glaser ........................... | 460/69 |
| 4,505,279 A | * | 3/1985 | Campbell et al. .............. | 460/66 |
| 4,889,517 A | * | 12/1989 | Strong et al. .................. | 460/66 |
| 4,936,810 A | * | 6/1990 | Strong et al. .................. | 460/69 |
| 4,946,419 A | * | 8/1990 | Cromheecke et al. ......... | 460/68 |
| 4,964,838 A | * | 10/1990 | Cromheecke et al. ......... | 460/66 |
| 5,919,086 A | * | 7/1999 | Derry ........................... | 460/72 |
| 6,190,252 B1 | * | 2/2001 | Makeeff ........................ | 460/69 |
| 6,494,782 B1 | * | 12/2002 | Strong et al. .................. | 460/71 |
| 6,500,063 B1 | * | 12/2002 | Gryspeerdt ................... | 460/79 |

* cited by examiner

Primary Examiner—Árpád Fábián Kovács

(57) ABSTRACT

A rotor for a combine harvester comprises a thresher portion to which a plurality of thresher elements are fitted for threshing the crop material and a driver portion for driving the threshed material rearwardly through the housing. Impeller blades are fitted to the front of the rotor for facilitating the entry of the crop material into the cylindrical housing. A plurality of pins are attached to the driver portion of the rotor to drive the threshed material rearwardly through the combine harvester and at the same time to separate the crop from the chaff.

9 Claims, 1 Drawing Sheet

ROTOR FOR A COMBINE HARVESTER

BACKGROUND OF THE INVENTION

1. Field of the Invention

THIS invention relates to a rotor for a combine harvester.

2. Description of the Related Art

Combine harvesters are used to reap and thresh a grain crop in order to remove the grain from the ears of the grain crop. Typical rotors used in these combine harvesters are fitted with a plurality of thresher elements for threshing the crop material as the material passes through the harvester. Significantly, however, these thresher elements extend along the entire length of the rotor, which has been found to be overly aggressive when threshing the crop material, thus tending to damage the grain itself as well as slowing the harvester.

It would therefore be desirable to provide a rotor for a combine harvester that addresses the abovementioned problems.

SUMMARY OF THE INVENTION

According to the invention there is provided a rotor for a combine harvester, wherein the rotor, in use, is housed and able to rotate within a housing defined within the combine harvester, the rotor comprising:

an elongate body extending between a front portion over which crop material is able to pass when the crop material enters the housing and a rear portion over which the crop material is able to pass when the crop material is being expelled out of the rear of the housing;

a threshing portion extending along a part of the elongate body of the rotor between the front portion and the rear portion, the threshing portion having a plurality of thresher elements connected thereto for threshing crop material; and a driver portion extending along a part of the elongate body of the rotor between the threshing portion and the rear portion, the driver portion having at least one driver element connected thereto for driving the threshed material rearwardly from the threshing portion towards the rear portion.

The driver element is preferably a helical element.

An impeller blade may be fitted to the front portion of the rotor for facilitating the entry of the crop material into the cylindrical housing.

Preferably, a plurality of pins are attached to the driver portion of the rotor to drive the threshed material rearwardly through the combine harvester and to separate the threshed produce from the chaff.

The length of the threshing portion may be between approximately 0.9 m and 1.3 m and the length of the driver portion is between approximately 0.9 m and 1.3 m.

Conveniently, a plurality of kicker plates are connected to the rotor for discharging the chaff out of the back of the harvester.

DESCRIPTION OF A PREFERRED EMBODIMENT

Figure 1:
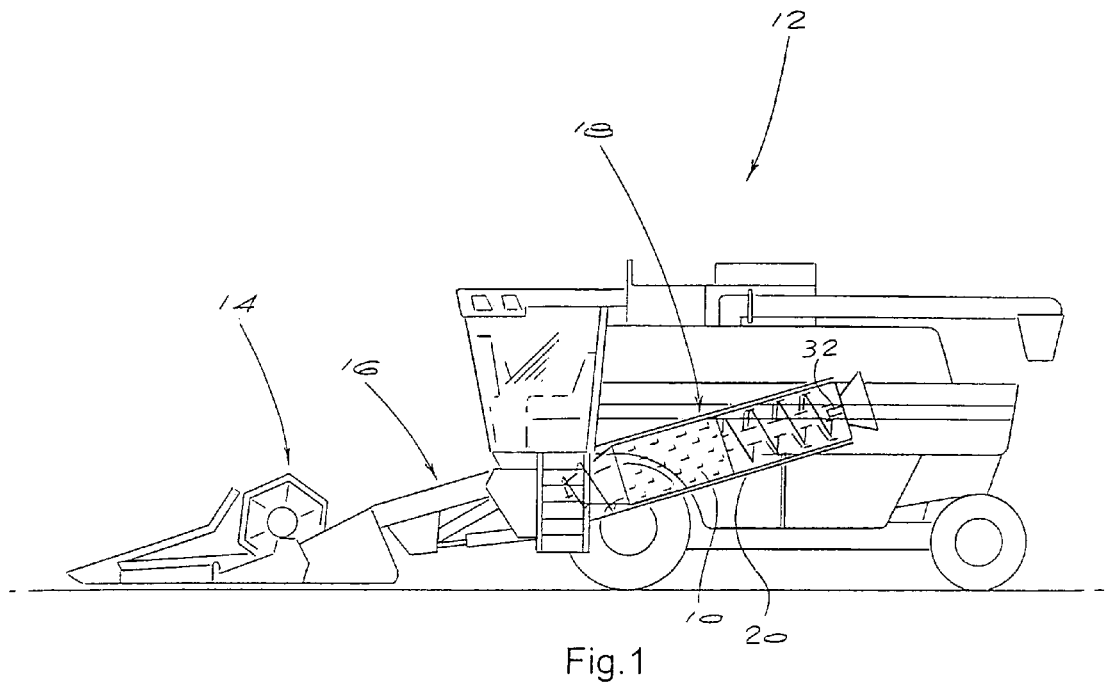
FIG. 1 shows a partially cross-sectional side view of a conventional combine harvester fitted with a rotor according to the present invention.
Figure 2:
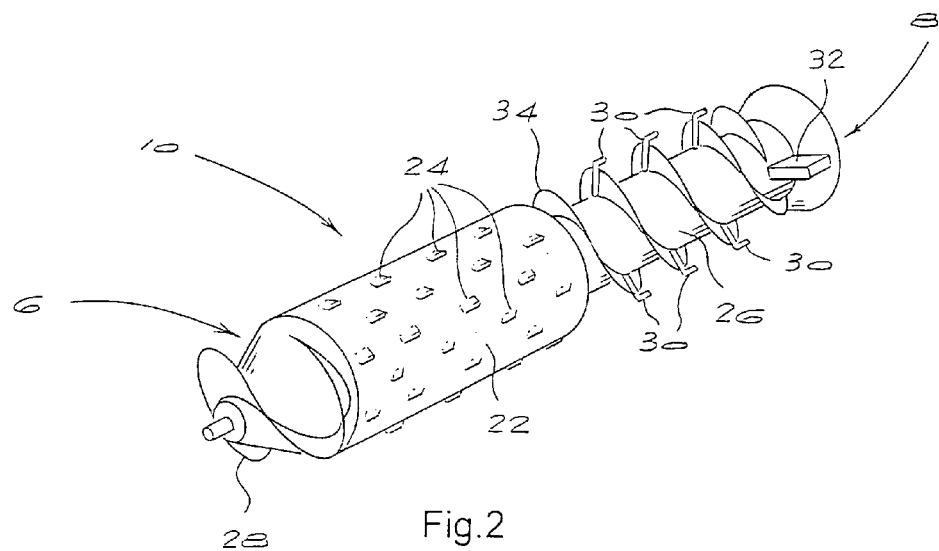
FIG. 2 shows a detailed perspective view of the rotor of the present invention.

Referring to the figures, a rotor 10 is shown fitted within a conventional combine harvester 12. The combine harvester 12 comprises a front, reaping arrangement 14 for cutting or collecting grain crop material as the harvester 12 is being driven through a crop field.

A feeder arrangement 16 is located behind the reaping arrangement 14 for feeding the cut crop material to a threshing arrangement 18 within the harvester 12. The threshing arrangement 18 comprises the rotor 10, which is arranged to rotate within a cylindrical housing 20 so that as the crop material passes between the rotor 10 and the housing 20 it gets threshed in order to remove the grain from the ears of the grain crop.

Significantly, the rotor 10 comprises an elongate body extending between a front portion 6 over which crop material is able to pass when the crop material enters the housing and a rear portion 8 over which the crop material is able to pass when the crop material is being expelled out of the rear of the housing.

Impeller blades 28 are fitted to the front portion 6 for facilitating the entry of the crop material into the cylindrical housing 20 that also houses the concaves and grates for different grains.

A threshing portion 22 has a plurality of thresher elements 24 fitted thereto for threshing the crop material. The threshing portion 22 extends along a part of the elongate body of the rotor between the front portion 6 and the rear portion 8.

A driver portion 26 extends along a part of the elongate body of the rotor 10 between the threshing portion 22 and the rear portion 8, the driver portion having at least one driver element 34 connected thereto for driving the threshed material rearwardly from the threshing portion 22 towards the rear portion 8.

The driver element 34 in the illustrated embodiment takes the form of a helical driver element which may be formed from a single helix or may be formed from sections of helix. It will be appreciated that other driver elements may be used to accomplish the same function of driving the threshed crop material towards the rear portion 8 of the rotor 10.

Preferably, a plurality of pins 30 are attached to the driver portion 26 of the rotor 10 to drive the threshed material rearwardly through the combine harvester 12 and at the same time to separate the crop from the chaff.

The length of the threshing portion 22 is between approximately 0.9 m and 1.3 m, and the length of the driver portion 26 is between approximately 0.9 m and 1.3 m. It will be appreciated that the threshing portion and the driver portion are of approximately equal size.

The primary advantage of the present invention is that the thresher elements only extend over a portion of the length of the rotor, with the remaining portion simply taking the form of a helical arrangement for pushing the threshed crop material towards the rear of the harvester, in order to separate the seed from the chaff.

A plurality of kicker plates 32 discharges the chaff out of the back of the harvester.

It will be appreciated that the rotor of the present invention can be used to thresh a number of different kinds of crops.

Preliminary trials conducted on a rotor of the present invention indicate that the rotor can be used on various types of crops including edible beans. This means that the rotor does not have to be replaced when the harvester will be used to harvest edible beans.

The rotor was found to allow crops to be harvested substantially faster than prior art rotors as the helical portion at the back of the rotor means that the threshed crops do not get caught up at the back and are rather passed through the rotor much more quickly without clogging up inside the housing in which the rotor is housed.

This translates to the harvester being able to harvest a larger number of acres per day leading to an increase in efficiency as well as a decrease in the amount of fuel required.

Because there is less clogging of the produce and chaff along the back of the rotor, it has been found that the rotor can be used to harvest green or wet crops which can not generally be harvested by prior art rotors due to the clogging which occurs with these prior art rotors.

I claim:

1. A rotor for a combine harvester, wherein the rotor, in use, is mounted to rotate within a housing defined within the combine harvester, the rotor comprising:
   - an elongate body extending from a front portion, over which crop material passes when the crop material enters the housing, to a rear portion over which the crop material passes when the crop material is being expelled out of a rear of the housing;
   - a threshing portion extending along a first portion of a length of the elongate body of the rotor between the front portion and the rear portion, the threshing portion having a plurality of thresher elements connected thereto for threshing crop material;
   - a driver portion extending along a second portion of the length of the elongate body of the rotor between the threshing portion and the rear of the housing, the driver portion having a driver element connected thereto, the driver element being in a form of at least one helical element that extends outwardly from the elongate body of the rotor and spirals around the rotor a plurality of times along the driver portion from adjacent the threshing portion and toward the rear portion of the housing, the driver element, in use, driving the threshed crop material rearwardly from the threshing portion towards the rear of the housing; and
   - wherein a diameter of the driver portion of the rotor being smaller than a diameter of the threshing portion of the rotor.

2. A rotor for a combine harvester according to claim 1 wherein the driver element is a continuous helical element.

3. A rotor for a combine harvester according to claim 1 wherein an impeller blade is mounted to the front portion of the rotor for facilitating entry of the crop material into the housing which is generally cylindrical.

4. A rotor for a combine harvester according to claim 1 wherein a plurality of pins are attached to the driver portion of the rotor to drive the threshed material rearwardly through the housing and to separate the threshed crop material from chaff.

5. A rotor for a combine harvester according to claim 1 wherein the length of the threshing portion is between approximately 0.9 m and 1.3 m and the length of the driver portion is between approximately 0.9 m and 1.3 m.

6. A rotor for a combine harvester according to claim 1 wherein a plurality of kicker plates are connected to the rear portion of the rotor for discharging chaff out of the rear of the housing.

7. A rotor for a combine harvester according to claim 1 wherein the driver element is in a form of helical sections.

8. A combine harvester including a reaping assembly for cutting crop material, a feeder for feeding cut crop material from the reaping assembly to a threshing assembly, the threshing assembly including a rotor mounted to rotate within a housing defined within the combine harvester, the rotor including an elongate body extending from a front portion, over which crop material passes when the crop material enters the housing, to a rear portion over which the crop material passes when the crop material is being expelled out of a rear of the housing, a threshing portion extending along a first portion of a length of the elongate body of the rotor between the front portion and the rear portion, the threshing portion having a plurality of thresher elements connected thereto for threshing crop material, a driver portion extending along a second portion of the of the rotor between the threshing portion and the rear housing, the driver portion having a driver element connected thereto, the driver element being in a form of at least one helical element that extends outwardly from the elongate body of the rotor and spirals around the rotor a plurality of times along the driver portion from adjacent the threshing portion and toward the rear portion of the housing, the driver element, in use, driving the threshed crop material rearwardly from the threshing portion towards the rear of the housing, and a diameter of the driver portion of the rotor being smaller than a diameter of the threshing portion of the rotor.

9. A rotor for a combine harvester, wherein the rotor, in use, is mounted to rotate within a housing defined within the combine harvester, the rotor comprising:
   - an elongate body extending from a front portion, over which crop material passes when the crop material enters the housing, to a rear portion over which the crop material passes when the crop material is being expelled out of a rear of the housing;
   - a threshing portion extending along a first portion of a length of the elongate body of the rotor between the front portion and the rear portion, the threshing portion having a plurality of thresher elements connected thereto for threshing crop material;
   - a driver portion extending along a second portion of the length of the elongate body of the rotor between the threshing portion and the rear of the housing, the driver portion having a driver element connected thereto, the driver element being in a form of at least one helical element that extends outwardly from the elongate body of the rotor and spirals around the rotor a plurality of times along the driver portion from adjacent the threshing portion and toward the rear portion of the housing, the driver element, in use, driving the threshed crop material rearwardly from the threshing portion towards the rear of the housing; and
   - wherein a plurality of pins are attached to the driver portion of the rotor to drive the threshed material rearwardly through the housing and to separate the threshed crop material from chaff.

* * * * *